United States Patent [19]
Kohke

[11] 3,739,429
[45] June 19, 1973

[54] BUNDLING STRAP

[75] Inventor: Stephen J. Kohke, Bridgewater Township, N.J.

[73] Assignee: Thomas & Betts Corporation, Elizabeth, N.J.

[22] Filed: Feb. 14, 1972

[21] Appl. No.: 226,176

[52] U.S. Cl. ............................................ 24/16 PB
[51] Int. Cl. ........................................... B65d 63/00
[58] Field of Search ................... 24/16 PB, 206 A, 24/208 A, 30.5 P, 150 FP, 73 PB, 123 D; 248/74 PB, 73; 292/320, 325

[56] References Cited
UNITED STATES PATENTS

| 2,592,696 | 4/1952 | Hoody | 24/123 D UX |
| 2,977,145 | 3/1961 | Rifkin | 248/74 PB UX |
| 3,457,598 | 7/1969 | Mariani | 24/16 PB |
| 3,461,510 | 8/1969 | Holmes | 24/16 PB |
| 3,530,544 | 9/1970 | Burniston | 24/16 PB |
| 3,192,584 | 7/1965 | Pape | 24/16 PB |
| 881,407 | 3/1908 | Jewett | 292/325 |
| 3,147,523 | 9/1964 | Logan | 24/16 PB |
| 3,568,262 | 3/1971 | Woldman | 24/16 PB |

FOREIGN PATENTS OR APPLICATIONS

| 29,370 | 11/1970 | Australia | 248/73 |
| 621,438 | 6/1961 | Italy | 24/16 PB |

Primary Examiner—Donald A. Griffin
Attorney—David Teschner and Jesse Waldman et al.

[57] ABSTRACT

A bundling strap formed preferably of plastic material having a plurality of body portions individually insertable within a head portion having an aperture comprising, in one embodiment, at least two independently deflectable locking members each engageable with an associated one of said body portions to permit the convenient restraint of a plurality of individual articles such as tubular members, cable breakouts, and the like, with a single sprap. In another embodiment, a twist type arrangement is provided wherein the strap head portion comprises pairs of opposed recessed portions each pair being selectively contoured to accept a planarly displaced segment of an associated strap body portion. The independently deflectable locking members may be disposed in juxtaposed, offset, or opposed relationship within the head portion aperture and may be formed either integrally therewith or supplied as discrete inserts.

23 Claims, 15 Drawing Figures

PATENTED JUN 19 1973 3,739,429

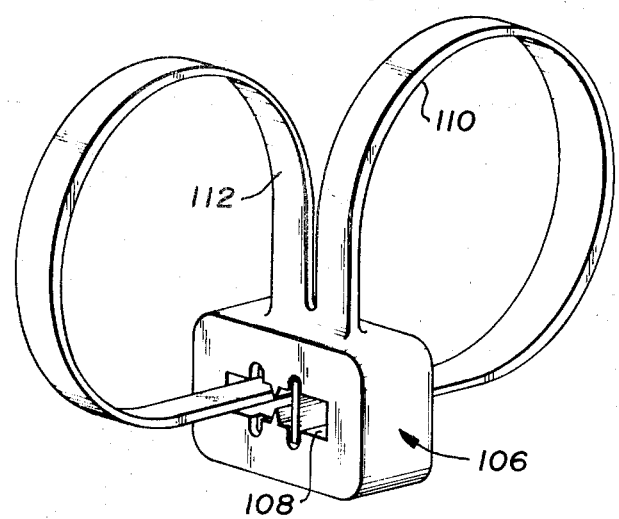
FIG. 10
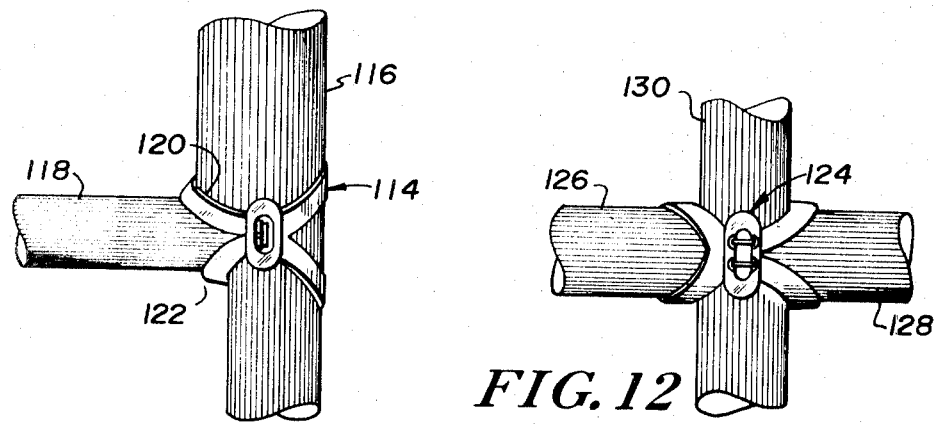
FIG. 11
FIG. 12
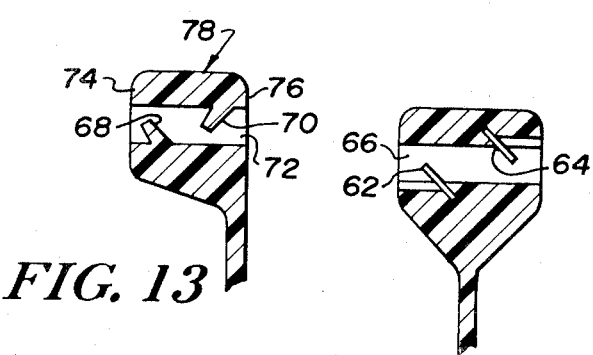
FIG. 13
FIG. 14
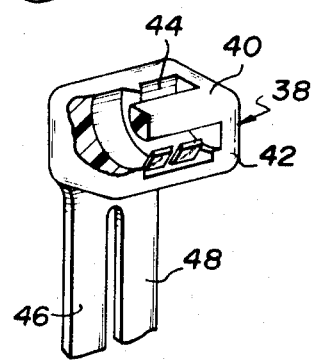
FIG. 15

3,739,429

1
BUNDLING STRAP

BACKGROUND OF THE INVENTION

1. Field of the Invention

The invention is directed to the field of banding devices and principally to a novel form of bundling strap.

2. Description of the Prior Art

Prior art bundling straps of the type exemplified, for example, in U.S. Pat. Nos. 3,590,442, 3,618,173, 3,457,598 and 3,488,813 generally comprised a unitary body portion disposed intermediate an apertured head portion and a generally tapered tail portion for looped disposition about a article such as a cable harness or the like to constrain the wires contained therewithin. Although such straps are generally adequate for many purposes it is generally necessary to employ a plurality of such straps where a cable breakout is encountered. In such case, a single strap would be required for each individual breakout and for the main cable body, resulting in an expensive and time consuming operation at each such breakout. Since economy in both labor and material costs is an important factor in the construction of wire harnesses, there has been a great need for a device which would simplify such operations and reduce the cost of such assembly.

SUMMARY OF THE INVENTION

The invention overcomes the limitations noted above with respect to prior art devices by providing a bundling strap having at least two body portions extending from a head portion comprising at least one selectively contoured aperture which, in one embodiment, is provided with at least two independently deflectable protrusions extending into the aperture and proportioned to engage an associated one of said strap body portions upon the insertion of said body portions within the aperture to thus provide individual loops which may be tightened about separated portions of either one or a multiple of cable or tubular members to effect a convenient, rapid, and economical composite tie. The deflectable protrusions may take the form of metallic barb like members inserted within the head, or integrally molded tongue like segments which, in either case, may be disposed in substantially adjacent relationship or in opposing offset relationship within the head aperture as necessary or desirable. In another embodiment of the invention, a plurality of opposed pairs of recessed portions communicating with the head portion aperture and configured to accept a planarly disposed segment of an associated strap body portion are provided to permit so called twist type strap configurations to be utilized therewith. The body portions of the strap may extend from the head portion either generally parallel or normal to the plane of a first face of the head portion and may extend either from the same or oposite sides thereof. It is therefore an object of this invention to provide a novel form of bundling strap.

It is another object of this invention to provide means for reducing the number of bundling straps required in a particular sssembly.

It is a further object of this invention to provide a bundling strap having independently manipulable body portions.

It is yet another object of this invention to provide a novel form of bundling strap having a multicompartment head portion.

2

It is still a further object of this invention to provide a versatile self-locking bundling strap.

It is still another object of this invention to provide a novel form of bundling strap having independently deflectable locking means within the head portion thereof.

It is yet a further object of this invention to provide means for independently restraining a plurality of adjacently disposed tubular articles by means of a single bundling strap.

Other objects and features of the invention will be pointed out in the following description and claims and illustrated in the accompanying drawings, which disclose, by way of example, the principle of the invention and the best mode contemplated for carrying it out.

BRIEF DESCRIPTION OF THE DRAWINGS

In the Drawings:

FIG. 10 is a perspective view of the device of FIG. 8 showing the body portions thereof engaged within the head portion.

FIG. 11 is a fragmentary perspective view illustrating a manner of use of a bundling strap constructed in accordance with the concepts of tbe invention.

FIG. 12 is a fragmentary perspective view of another manner of use of a bundling strap constructed in accordance with the concepts of the invention.

FIG. 13 is a fragmentary side elevational view, in section, of still a further embodiment of the head portion of a bundling strap constructed in accordance with the concepts of the invention.

FIG. 14 is a fragmentary side elevational view, in section, of still another embodiment of the head portion of a bundling strap constructed in accordance with the concepts of the invention.

FIG. 15 is a fragmentary perspective view, partly in section, of yet another embodiment of a portion of a

Figure 1:
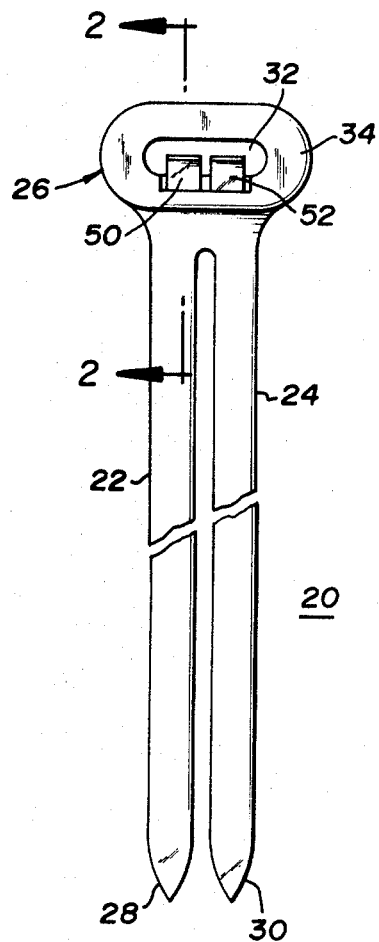
FIG. 1 is a fragmentary front elevational view of a bundling strap constructed in accordance with the concepts of the invention.
Figure 2:
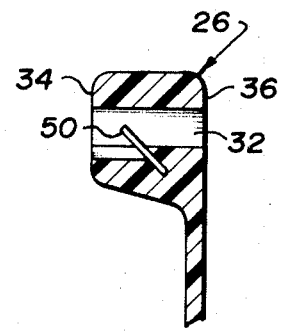
FIG. 2 is a side elevational view, in section, of the head portion of the device of FIG. 1 taken along the line 2—2 thereof.
Figure 3:
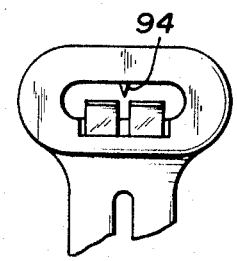
FIG. 3 is a front elevational view of the head portion of another embodiment of a bundling strap constructed in accordance with the concepts of the invention.
Figure 4:
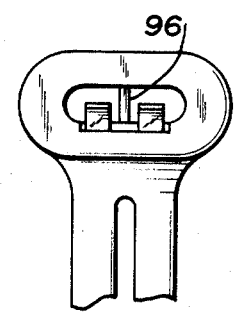
FIG. 4 is a front elevational view of the head portion of a further embodiment of a bundling strap constructed in accordance with the concepts of the invention.
Figure 5:
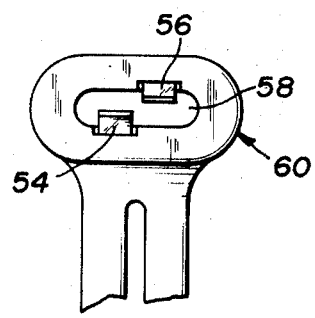
FIG. 5 is a front elevational view of the head portion of yet another embodiment of a bundling strap constructed in accordance with the concepts of the invention.
Figure 6:
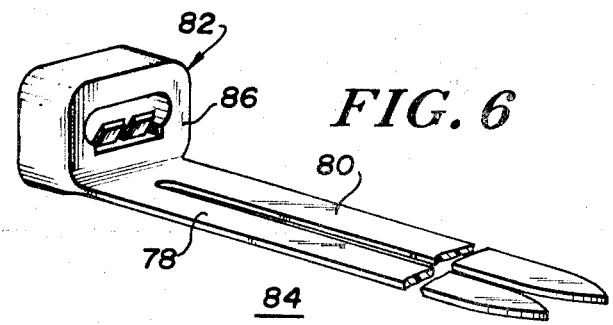
FIG. 6 is a fragmentary perspective view of another embodiment of a bundling strap constructed in accordance with the concepts of the invention.
Figure 7:
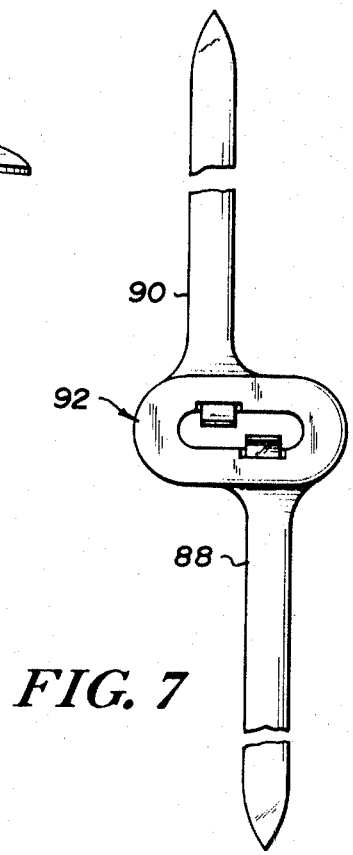
FIG. 7 is a fragmentary front elevational view of still a further embodiment of a bundling strap constructed in accordance with the concepts of the invention.

DESCRIPTION OF THE PREFERRED EMBODIMENTS:

Turning now to FIGS. 1 and 2 there is shown a bundling strap 20 constructed in accordance with the concepts of the invention. Strap 20 comprises a pair of longitudinally extending body portions 22, 24 disposed in essentially juxtaposed relation and terminating in a head portion 26 and at one end and a first tail portion 28 adjacent the free end of body portion 22 and a second tail portion 30 adjacent the free end of body portion 24. Extending generally transversely through head portion 26 intermediate a first face 34 and a second face 36 thereof is a strap receiving aperture 32 suitably proportioned to permit the insertion therewithin of body portions 22 and 24. Although first and second faces 34 and 36 respectively, are shown disposed in essentially spaced parallel relationship, the arrangement may be suitably modified, as shown for example, in FIG. 15, wherein there is illustrated a bundling strap head portion 38 having a second face 40 disposed essentially perpendicular to a first face 42. Extending between faces 40 and 42 of head portion 38 is a generally arcuately formed aperture 44 selectively proportioned to receive the body portions 46, 48 extending from the head portion 38. Returning now to FIGS. 1 and 2 there is shown extending into the aperture 32 of head portion 26 a pair of obliquely angled deflectable members 50, 52 disposed in essentially adjacent relationship and proportioned to at least partially restrict the opening defined by aperture 32. Each of the members 50, 52 may be deflected independently of the other and may be formed of either two discrete elements or a single slotted element the unslotted portion of which may be engaged within the head portion 26 to retain said members 50, 52 in position. Although the juxtaposed arrangement of members 50, 52 shown in FIG. 1 may be advantageous for certain applications, the relative positions of said members may be readily varied, as shown for example, in FIG. 5, where there is illustrated a pair of deflectable members 54, 56 aRranged in generally opposing offset relationship and extending at least partially into an aperture 58 in a bundling strap head portion 60, the adjacent opposing edges of said members thus conveniently dividing aperture 58 into two distinct strap receiving channels. The specific contour of aperture 32 may be selected preferably to conform closely to the cross sectional contour of the strap body portions 22, 24 although this is not absolutely necessary since, of course, it will be readily apparent to those skilled in the art that almost any suitable contour may be employed which would provide sufficient restriction of the body portions 22 and 24 within the aperture 32. The deflectable members 50, 52 may be disposed in essentially adjacent coplanar relationship within head portion 26 generally as shown in FIG. 1, or may be disposed in adjacent opposing angular relationship (not shown) wherein one of the strap body portion 22, 24 may be inserted within aperture 32 from one side thereof while the other body portion is inserted from the other side, each being effectively retained within the aperture 32 by engagement with its associated deflectable member. An example of a further arrangement of the deflectable members may be seen in FIG. 14 wherein a pair of deflectable members 62, 64 is disposed in opposing off-set relationship and extends at least partially into the head portion aperture 66. Member 62 is selectively oriented to provide a strap restraint for a strap body portion (not shown) approaching from the right of the FIG. 14 through aperture 66, and member 64 is selectively oriented to provide a strap restraint for a strap body portion approaching from the left of FIG. 14 through aperture 66. An example of a bundling strap head portion suitably adapted to receive strap body portions from a single side of the head portion is shown in FIG. 13. Projecting at least partially into a head portion aperture 72 extending between a first face 74 and second face 76 of head portion 78 are a pair of deflectable members 68, 70 disposed in generally opposing offset or staggered relationship but contrary to the arrangement shown in FIG. 14, and planarly disposed in generally oblique planar relationship with one another, each of the members 68, 70 thus providing a restraint for an associated strap body portion approaching from the right or second face 76 of head portion 78 through aperture 72. Although in the embodiment shown in FIG. 14 the body portions are shown extending generally centrally from the head portion, and in the embodiment shown in FIG. 13 the body portions are shown extending from one side of the head portion, the respective arrangements are illustrated in the manner shown for convenience only, either arrangement of deflectable members being equally adaptable in conjunction with either one of the extending body portion arrangements shown. Where necessary or desirable an embodiment similar to that shown in FIG. 6 may be effectively employed for the purposes set forth herein. As shown therein a pair of strap body portions 78, 80 extend outwardly from a head portion 82 of strap 84 generally perpendicular to the plane of a first face 86 of head portion 82. The strap body portions heretofore illustrated and described although shown as disposed in essentially adjacent juxtaposed relation, may alternatively be disposed generally as shown in FIG. 7 wherein each of a pair of strap body portions 88, 90 extends from an opposite side of a head portion 92. It will of course be readily apparent to those skilled in the art that the arrangement shown in FIG. 7 may be suitably modified to provide an additional strap body portion (not shown) such as 90 extending from the same side of head portion 92, and an additional deflectable member such as 50 (FIG. 1) thereby providing an essentially Y-type configuration, where desirable. The head portion aperture 32 of strap 20 shown in FIG. 1 may be provided with a generally longitudinally extending protrusion or rib such as 94 shown in FIG. 3, or a full web such as 96 shown in FIG. 4, wherein the aperture 32 is effectively divided into two channel like openings each proportioned to receive a respective one of the strap body portions.

Figure 8:
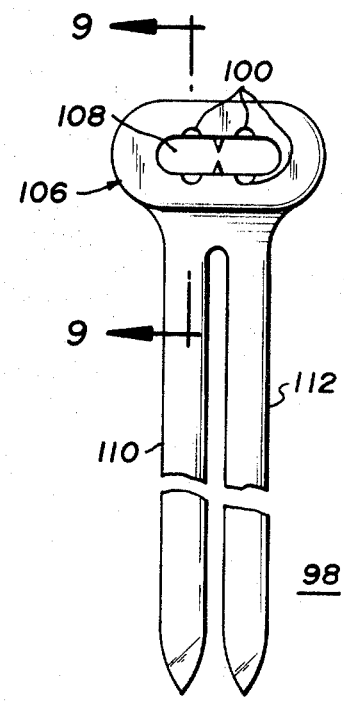
FIG. 8 is a fragmentary front elevational view of still a further embodiment of a bundling strap constructed in accordance with the concepts of the invention.
Figure 9:
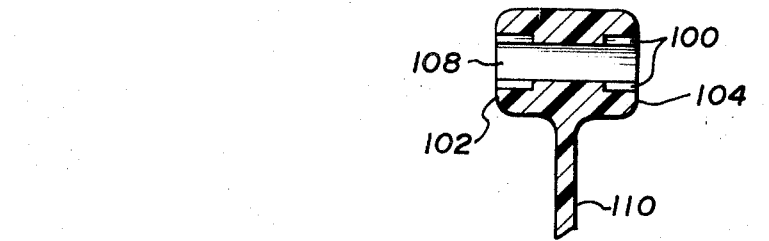
FIG. 9 is a side elevational view, in section, of a portion of the strap of FIG. 8 taken along the line 9—9 thereof.

Turning now to FIGS. 8, 9 and 10 there is shown a further embodiment of a bundling strap 98 constructed in accordance with the concepts of the invention. Strap 98, formed preferably of plastic material, is constructed in a manner similar to that described above with respect to bundling strap 20 but differs however in the employment of selectively contoured recessed portions 100 arranged in opposing pairs within each of the first and second faces 102 and 104, respectively, of the head portion 106 of strap 98. Each of the recessed portions 100 communicate with the head portion aperture 108, and each pair thereof is selectively dimensioned to provide a strap engaging slot proportioned to receive a planarly displaced segment of a respective one of the strap body portions 110, 112 extending from head portion 106 in a manner more clearly shown in FIG. 12. Each of the strap body portions 110 and 112 are restrained from removal from the head portion aperture 108 by twisting that segment of the strap body portion adjacent the aperture 108 through approximately a 90° angle, whereby the resulting deformed segment of the body portion is thus firmly captured and held in a respective pair of recesses 100, thereby eliminating the need for locking members such as 30, 32 (FIG. 1). It will, of course, be readily appreciated that deflectable members such as 30, 32, which may be oriented in any one of the arrangements heretofore described may be provided in the embodiment shown in FIGS. 8 through 10 to increase the versatility thereof by providing a structure equally adaptable for use with either a twist type or self-locking arrangement, as necessary or desirable.

To more fully appreciate the advantages of the instant device, reference is now made to FIGS. 11 and 12 where there is shown two typical applications employing the use of the instant device. It will, of course, be readily appreciated that either of the embodiments shown in FIG. 1 or FIG. 8 may be employed in either of these applications without departing from the spirit of the invention and within the concepts herein disclosed. In FIG. 11 a bundling strap 114 constructed in accordance with the concepts of the invention is shown selectively looped about a cable 116 adjacent a break out 118 extending outwardly therefrom. Each of the strap body portions 120, 122 of strap 114 are disposed, respectively, on either side of the break out 118 about the body of cable 116, thus effectively maintaining the break out 118 in the desired relationship with respect to cable 116. It will, of course be readily appreciated that the employment of the device in the manner shown in FIG. 11 advantageously eliminates the need for three bundling straps to effect a similar restraint since the cross configuration of the strap body portions 120, 122 tend to gather the individual elements in the breakout 118 to prevent their separation at the point of encirclement. In the assembly shown in FIG. 12, a bundling strap 124 is employed to suitably isolate and restrain two breakouts 126, 128 extending from cable 130, thus advantageously eliminating the need for at least three additional conventionally constructed bundling straps therewith.

The embodiment illustrated in FIG. 10 may be effectively employed to engage and securely restrain at least two or more tubular elements or cables disposed in essentially parallel relationship, thus advantageously increasing the versatility of the instant device.

The embodiments of the invention in which an exclusive property or privilege is claimed are defined as follows:

1. A bundling strap comprising: a head portion having a first face, a second face, and at least one aperture extending therebetween, said first and said second faces being generally flat and disposed in generally parallel planar relationship to define the front and the rear, respectively, of said head portion; a first body portion; a second body portion; each of said first and second body portions being coupled to and extending outwardly from said head portion and proportioned to be received within said aperture; a first tail portion extending from the free end of said first body portion; a second tail portion extending from the free end of said second body portion; and means in said head portion for enabling each of said first and said second body portions to be independently selectively positioned within and restrained from removal from said head portion aperture upon the insertion of said body portions therethrough.

2. A bundling strap as defined in claim 1 wherein said bundling strap is formed from plastic material.

3. A bundling strap as defined in claim 1 wherein said body portions extend from said head portion in generally normal axial relationship with the plane of said head portion first face.

4. A bundling strap as defined in claim 1 wherein said body portions are disposed in generally adjacent relationship.

5. A bundling strap comprising: a head portion having a first face, a second face, and at least one aperture extending therebetween; a first body portion; a second body portion; each of said first and second body portions being coupled to and extending outwardly from said head portion and proportioned to be received within said aperture; a first tail portion extending from the free end of said first body portion; a second tail portion extending from the free end of said second body portion; means in said head portion for enabling each of said first and said second body portions to be independently restrained from removal from said head portion aperture upon the insertion of said body portions therethrough; and a divider extending generally longitudinally within said aperture generally medially of the width thereof to divide said aperture into at least two channels, each proportioned to receive one of said first and said second body portions therein.

6. A bundling strap comprising: a head portion having a first face, a second face, and at least one aperture extending therebetween; a first body portion; a second body portion; each of said first and second body portions being coupled to and extending outwardly from said head portion and proportioned to be received within said aperture; a first tail portion extending from the free end of said first body portion; a second tail portion extending from the free end of said second body portion; and meanw in said head portion for enabling each of said first and said second body portions to be independently restrained from removal from said head portion aperture upon the insertion of said body portions therethrough; said body portions extending from said head portion generally parallel to the plane of said head portion first face.

7. A bundling strap comprising: a head portion having a first face, a second face, and at least one aperture extending therebetween, said first and said second faces being generally flat and disposed in generally parallel planar relationship to define the front and the rear, respectively, of said head portion; a first body portion; a second body portion; each of said first and second body portions being coupled to and extending outwardly from said head portion and proportioned to be received within said aperture; a first tail portion extending from the free end of said first body portion; a second tail portion extending from the free end of said second body portion; and locking means comprising at least two independently deflectable protrusions extending at least partially into said head portion aperture to at least partially restrict the opening thereof and proportioned for cooperable engagement with an associated one of said first and said second body portions upon the insertion of said body portions into said aperture, to independently restrict the removal of each of said first and second body portions therefrom.

8. A bundling strap as defined in claim 7 wherein said bundling strap is formed from plastic material.

9. A bundling strap as defined in claim 7 wherein said deflectable protrusions are disposed in generally adjacent relationship.

10. A bundling strap as defined in claim 7 wherein said deflectable protrusions are disposed in generally opposed offset relationship.

11. A bundling strap as defined in claim 7 wherein said deflectable protrusions are formed from metallic material.

12. A bundling strap as defined in claim 7 wherein said deflectable protrusions are formed integrally with said head portion.

13. A bundling strap as defined in claim 7 wherein said body portions extend from said head portion in generally normal axial relationship with the plane of said head portion first face.

14. A bundling strap as defined in claim 7 wherein said body portions are disposed in generally adjacent relationship.

15. A bundling strap as defined in claim 7 wherein said body portions are disposed in generally coplanar relationship.

16. A bundling strap comprising: a head portion having a first face, a second face, and at least one aperture extending therebetween; a first body portion; a second body portion; each of said first and second body portions being coupled to and extending outwardly from said head portion and proportioned to be received within said aperture; a first tail portion extending from the free end of said first body portion; a second tail portion extending from the free end of said second body portion; locking means comprising at least two independently deflectable protrusions extending at least partially into said head portion aperture to at least partially restrict the opening thereof and proportioned for cooperable engagement with an associated one of said first and said second body portions upon the insertion of said body portions into said aperture, to independently restrict the removal of each of said first and second body portions therefrom; and a divider extending generally longitudinally within said aperture generally medially of the width thereof to divide said aperture into at least two channels, each proportioned to receive one of said first and said second body portions therein.

17. A bundling strap comprising: a head portion having a first face, a second face, and at least one aperture extending therebetween; a first body portion; a second body portion; each of said first and second body portions being coupled to and extending outwardly from said head portion and proportioned to be received within said aperture; a first tail portion extending from the free end of said first body portion; a second tail portion extending from the free end of said second body portion; and locking means comprising at least two independently deflectable protrusions extending at least partially into said head portion aperture to at least partially restrict the opening thereof and proportioned for cooperable engagement with an associated one of said first and said second body portions upon the insertion of said body portions into said aperture, to independently restrict the removal of each of said first and second body portions therefrom; said body portions extending from said head portion generally parallel to the plane of said head portion first face.

18. A bundling strap comprising: a head portion having a first face, a second face, and at least one aperture extending therebetween; a first body portion; a second body portion; each of said first and said second body portions being coupled to and extending outwardly from said head portion and proportioned to be received within said aperture; a first tail portion extending from the free end of said first body portion; a second tail portion extending from the free end of said second body portion; and selectively contoured recessed portions disposed in said head portion and arranged in opposing pairs communicating with said aperture adjacent at least one of said first and said second faces thereof for engaging a planarly displaced segment of an associated one of said first and second body portions inserted within said aperture to independently restrict the removal of each of said first and second body portions therefrom.

19. A bundling strap as defined in claim 18 wherein said bundling strap is formed from plastic material.

20. A bundling strap as defined in claim 18 further comprising a divider extending generally longitudinally within said head portion aperture generally medially of the width thereof to divide said aperture into at least two channels each proportioned to receive one of said first and said second body portions therein.

21. A bundling strap as defined in claim 18 wherein said body portions extend from said head portion in generally normal axial relationship with the plane of said head portion first face.

22. A bundling strap as defined in claim 18 wherein said body portions extend from said head portion generally parallel to the plane of said head portion first face.

23. A bundling strap as defined in claim 18 wherein said body portions are disposed in generally adjacent relationship.

* * * * *